US006581694B2

(12) United States Patent
Golner et al.

(10) Patent No.: US 6,581,694 B2
(45) Date of Patent: Jun. 24, 2003

(54) METHOD AND SYSTEM FOR CONTROLLING THE SUPPLY OF NITROGEN TO ELECTRICAL POWER HANDLING EQUIPMENT

(75) Inventors: Thomas M. Golner, Pewaukee, WI (US); Shirish P. Mehta, Waukesha, WI (US)

(73) Assignee: Waukesha Electrical Systems, Inc., Waukesha, WI (US)

( * ) Notice: Subject to any disclaimer, the term of this patent is extended or adjusted under 35 U.S.C. 154(b) by 0 days.

(21) Appl. No.: 09/750,268

(22) Filed: Dec. 29, 2000

(65) Prior Publication Data

US 2002/0084080 A1 Jul. 4, 2002

(51) Int. Cl.[7] ........................ A62C 35/00; A62C 37/36; B05B 17/00; B05B 1/30; B29C 45/02

(52) U.S. Cl. ............................... 169/66; 169/69; 169/8; 169/20; 239/1; 239/87; 239/533.1; 239/68

(58) Field of Search ............................... 239/87, 533.1, 239/569, 1, 11, 124, 126, 67, 68; 169/66, 69, 8, 20; 336/90, 94; 220/88.3

(56) References Cited

U.S. PATENT DOCUMENTS 3,680,359 A * 8/1972 Lynch ........................ 73/27 R
3,691,730 A * 9/1972 Hickey et al. ................ 55/166
3,788,040 A * 1/1974 Bragg et al. .................. 55/160
3,798,898 A * 3/1974 Delahaye ................... 60/39.02
5,226,931 A 7/1993 Combler ........................ 55/16
5,302,189 A 4/1994 Barbe et al. ................... 95/54
5,308,382 A 5/1994 Prasad ........................... 95/12
5,388,413 A 2/1995 Major et al. .................... 62/11
5,491,731 A * 2/1996 Corpora et al. ............. 376/307
5,507,855 A 4/1996 Barry ............................ 95/12
5,588,984 A 12/1996 Verini ........................... 95/15
5,649,995 A 7/1997 Gast, Jr. ........................ 95/12
5,688,306 A 11/1997 Verini ........................... 95/15
6,032,704 A * 3/2000 Huang et al. ................ 141/98

OTHER PUBLICATIONS

Avoiding the Hassles of Liquid Nitrogen, Plant Notebook, reprinted from Chemical Engineering, Jul. 1993, copyright 1993 by McGraw–Hill.

Positive Pressure Oil Preservation System, Waukesha, 11/97, pp. 1–4.

Preventive Technologies, Insoil Canada Ltd., http://www.insoil.ca/protection.html. Mar. 23, 2000.

* cited by examiner

*Primary Examiner*—Michael Mar
*Assistant Examiner*—Davis Hwu
(74) *Attorney, Agent, or Firm*—Baker & Hostetler, LLP

(57) ABSTRACT

A system that controls nitrogen pressure in the ullage of a power transformer that has its windings submerged in oil. The pressure is controlled in a narrow range of approximately 0.5 psi to approximately 2.0 psi. A nitrogen generator supplies the nitrogen to a reservoir from which it is distributed to the ullage as well as to accessories such as a load tap changer or a control box. A temperature regulator is provided for substation installations that are located in climates with wide ambient temperature variations to control the pressure of the generated nitrogen in an acceptable range.

13 Claims, 1 Drawing Sheet

METHOD AND SYSTEM FOR CONTROLLING THE SUPPLY OF NITROGEN TO ELECTRICAL POWER HANDLING EQUIPMENT

FIELD OF THE INVENTION

This invention relates to a method and a system that controls the supply of nitrogen to a gas volume in electrical power handling equipment, such as electrical transformers, and related equipment, such as load tap changers, control boxes and the like.

BACKGROUND OF THE INVENTION

An electrical power handling equipment, such as a transformer, includes a tank filed with oil in which the power handling devices or coils are disposed.

The gas volume or ullage above the oil in the tank is generally filled with nitrogen to avoid an air atmosphere that contaminates the oil due to oxidation and/or moisture absorption. The nitrogen has generally been supplied from high pressure cylinders regulated down to an appropriate pressure. The pressure in the ullage is controlled in a range of 0.5 psi to 5 psi. The use of nitrogen cylinders has some drawbacks. The nitrogen cylinders need to be replaced on a regular basis, since the ullage is changing due to changing temperature of the oil. Leaks sometimes arise in the cylinder that cause an earlier replacement. The cylinders are heavy and can cause injuries during the replacement process. The wide pressure range in the ullage can lead to substantial nitrogen bubbling in the oil due to pressure changes caused by weather conditions or other influences. If the bubbling occurs in the region of active contacts, arcing can occur. Also, cylinder replacement is a recurring cost.

Nitrogen generators derive nitrogen from a supply of compressed air. Nitrogen generators have a number of uses in manufacturing operations within the environment of a manufacturing plant as described in an article entitled "Avoiding the Hassles of Liquid Nitrogen", Chemical Engineering, July, 1993. These uses include keeping components dry, eliminating sparks during welding and providing a safety curtain at the entrance and exit of a hydrogen furnace. However, none of these applications involve an outdoor environment or a nitrogen interface with a volume of oil.

Accordingly, there is a need to supply nitrogen to electrical power handling equipment in an outdoor environment that is cost effective and eliminates the use of high-pressure cylinders.

SUMMARY OF THE INVENTION

The method and system of the present invention satisfy the aforementioned need by supplying nitrogen to the ullage above an oil volume in an electrical power handling equipment, such as a power transformer. The pressure in the ullage is controlled in a range of about 0.5 psi to about 2.0 psi. This substantially minimizes nitrogen bubbling in the oil due to changes in pressure as might occur due to changes in loading or weather. The nitrogen is derived by a nitrogen generator from a supply of compressed air.

In some embodiments of the invention, the nitrogen is supplied at a relatively low pressure during a normal operating interval and at a relatively high pressure during a start up interval. The low-pressure nitrogen is obtained with a nitrogen generator that derives the nitrogen from the compressed air supply. The high-pressure nitrogen is obtained from a high-pressure source such as a high-pressure cylinder.

In other embodiments, the ambient temperature of the power handling equipment is regulated in a range from a low temperature to a high temperature. This regulation is especially advantageous in power substations that house the electrical power handling equipment.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWING

Other and further objects, advantages and features of the present invention will be understood by reference to the following specification in conjunction with the accompanying drawings, in which like reference characters denote like elements of structure and the sole FIGURE is a block diagram of a system of the present invention that supplies nitrogen to an electrical power transformer and/or to accessories thereof.

DETAILED DESCRIPTION OF THE PREFERRED EMBODIMENTS

Figure 1:
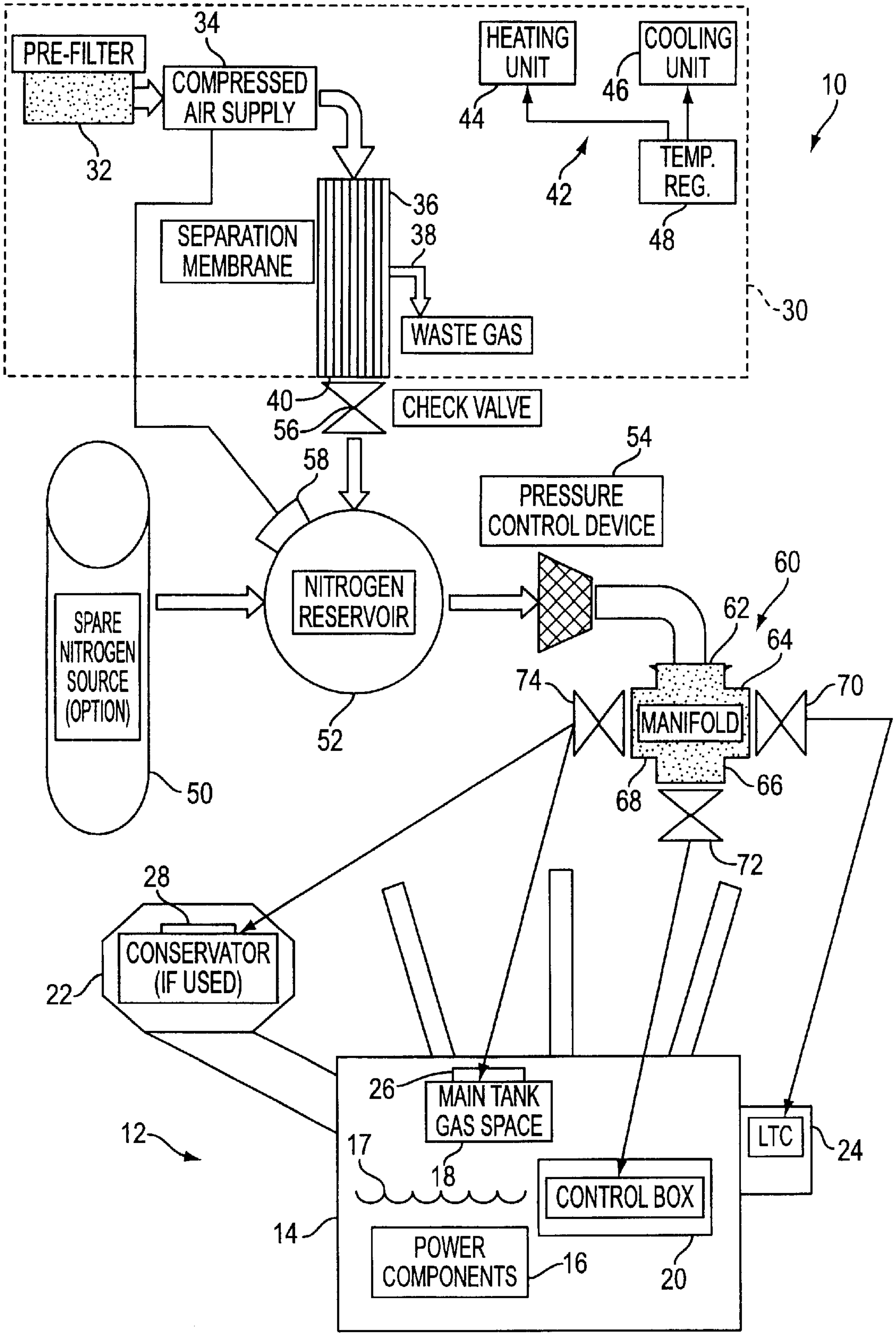

Referring to the FIGURE, a system 10 of the present invention supplies nitrogen to an electrical power handling equipment 12. Although electrical power handling equipment 12 may be any electrical power handling equipment with electrical components submerged in oil with a ullage, it is shown, by way of example, as a power transformer 14. Power transformer 14 includes power components 16 submerged in a volume of oil 17, a gas volume or ullage 18 and a control box 20. Power components 16 include transformer coils, metallic laminations and the like. Control box 20 contains terminals, switches, and the like, and is not submerged in oil 17.

In some installations, it may be desirable to completely fill power transformer 14 with oil. In such case, an oil overflow tank shown as a conservator 22 would be connected with power transformer 14. Conservator 22 has a gas volume or ullage (not shown in the FIGURE), to which nitrogen would be supplied.

Power transformer 14 may also have a load tap changer 24 for the purpose of switching the electrical power among various taps of the transformer windings. As will be described below, system 10 of the present invention is capable of delivering nitrogen to ullage 18 of power transformer 14, control box 20, conservator 22 and to load tap charger 24.

System 10 includes a nitrogen generator 30, a high-pressure nitrogen source 50, a nitrogen reservoir 52, a pressure control device 54, a check valve 56, a pressure transducer 58 and a manifold 60. Nitrogen generator 30 supplies nitrogen via check valve 56 to nitrogen reservoir 52. Nitrogen is supplied from reservoir 52 to power transformer 14 via a delivery path that includes pressure control device 54 and manifold 60. High pressure nitrogen source 50 may be a highly pressurized container that serves as a backup source or as a rapid charge source to quickly fill nitrogen reservoir 52 with nitrogen to a predetermined pressure. The predetermined pressure is maintained by means of transducer 58 that acts to turn compressed air supply 34 off when the predetermined pressure is attained and on when the pressure drops below the predetermined pressure.

Nitrogen generator 30 includes a pre-filter 32, a compressed air supply 34, a separation membrane 36, a waste gas port 38, a nitrogen port 40 and a temperature regulator 42. Pre-filter 32 filters particulate and vapor contaminates harmful to separation membrane 36 from air drawn into compressed air supply 34. Separation membrane 36 separates compressed air from compressed air supply 34 into nitrogen and waste gas that are delivered to nitrogen port 40 and waste gas port 38, respectively. Check valve 56 prevents back flow of nitrogen that may contain contaminates harmful to separation membrane 36. Pre-filter 32, compressed air supply 34, separation membrane 38, waste gas port 38 and nitrogen port 40 may be any suitable components, known currently or in the future, that perform the functions mentioned above.

It has been discovered that when nitrogen generator 30 is subjected to wide temperature variations that exist in outdoor environments, the pressure of the generated nitrogen can vary substantially. For the case where power transformer 14 and system 10 are housed in a power substation enclosure, temperature regulator 42 is provided to maintain the temperature within the enclosure in a predetermined range that avoids substantial changes in pressure of the generated nitrogen. This temperature range, for example, is from a low temperature value of approximately 0° C. to a high temperature value of approximately 40° C.

Temperature regulator 42 includes a heating unit 44, a cooling unit 46 and a temperature control unit 48. Heating unit 44 includes a heating element and a blower that cooperate with a vent in the substation to supply a stream of heated air to nitrogen generator 30. Cooling unit 46 includes a blower that supplies a stream of cooling air to nitrogen generator 30. For extremely warm environments, cooling unit 46 may also include a cooling element, such as, a thermoelectric cooler. Temperature control 48 includes temperature transducers for sensing the high and low temperatures and electric controls for turning heating unit 44 and cooling unit 46 on and off to maintain ambient temperature within the predetermined range. For even more efficient operation, heat sources, such as compressed air supply 34, are positioned as remotely as possible from heat sensitive components, such as separation membrane 36.

Manifold 60 has an input port 62 and a plurality of output ports 64, 66 and 68. Input port 62 is connected to receive nitrogen from pressure control device 54. Output ports 64, 66 and 68 are connected to a plurality of check valves 70, 72 and 74, respectively. Nitrogen received via input port 62 is distributed by manifold 60 to load tap changer 24, ullage 18, control box 20 and conservator 22. To this end, check valves 70 and 72 are connected to load tap changer 24 and control box 20, respectively. Check valve 74 is connected to either ullage 18 or to conservator 22, if used. Check valves 70, 72 and 74 prevent back flow of gas and contaminants from load tap changer 24, control box 20 and ullage 18 or conservator 22, if used.

According to the method of the present invention, a positive nitrogen atmosphere is controlled in ullage 18 or conservator 22. Nitrogen reservoir 52 is charged with nitrogen from nitrogen generator 30 or high-pressure nitrogen source to a predetermined pressure. The predetermined pressure is in a range of approximately 50 psi to approximately 150 psi. In one design embodying the invention the predetermined pressure is about 150 psi. When the predetermined pressure is attained, transducer 58 turns off compressed air supply 34. If the pressure drops below the predetermined pressure, transducer 58 turns on compressed air supply 34.

Pressure control device 54 converts the predetermined pressure to approximately 0.5 psi at input port 62 of manifold 60. Nitrogen at this pressure is delivered to ullage 18 via manifold 60, output port 68, check valve 74 and bleed valve 26. The pressure in ullage 18 changes due to oil temperature changes caused by transformer loading changes or to changes in ambient temperature, rain or snow caused by weather changes. Should the pressure exceed 2.0 psi, bleed valve 26 is set to vent or bleed nitrogen to atmosphere until the pressure drops below 2.0 psi. Bleed valve 28 is also set to bleed nitrogen at 2.0 psi. Thus, the pressure of nitrogen in ullage 18 is controlled in the range of approximately 0.5 psi to approximately 2.0 psi. This pressure range substantially reduces the probability that nitrogen bubbling in the oil will occur due to pressure changes.

This is in contrast to known systems in which the upper limit of the ullage pressure range is 5.0 psi.

Nitrogen generator 30 can be used at start up to charge nitrogen reservoir 52 to the predetermined pressure and thereafter to maintain the predetermined pressure. However, if a rapid charge time is necessary, high-pressure source 50 may be used in a start up interval to rapidly attain the predetermined pressure. High-pressure source 50 would then be turned off and nitrogen generator 30 would thereafter operate in normal intervals to maintain the predetermined pressure. This rapid charge procedure might be needed to decrease downtime of power transformer 14 after ullage 18 is purged in the field.

The method of the invention also includes the procedure of regulating the ambient temperature of nitrogen generator 30 in climates that are subject to wide temperature variations. This procedure cools nitrogen generator 30 when the temperature exceeds a maximum temperature of the predetermined range and heats nitrogen generator 30 when the temperature drops below the minimum temperature of the predetermined range.

System 10 and the method of the present invention provide a low cost supply of nitrogen to power transformer 14 and accessories, such as control box 20, conservator 22 and load tap changer 24. Although control box 20 and load tap changer 24 do not contain oil, a nitrogen atmosphere eliminates an air atmosphere that allows the formation of combustible gasses, condensation and corrosion of components. As compared to known systems that use only high pressure cylinders, nitrogen generator 30 has an estimated lifetime if 15 to 20 years vis-a-vis a need in the known system to replace the cylinder twice per year.

The present invention having been thus described with particular reference to the preferred forms thereof, it will be obvious that various changes and modifications may be made therein without departing from the spirit and scope of the present invention as defined in the appended claims.

The invention claimed is:

1. A method of controlling a positive nitrogen atmosphere in a ullage above a volume of oil in an electrical power handling equipment, said method comprising:

(a) supplying nitrogen to said ullage; and (b) controlling the pressure of said nitrogen in said ullage in a range of about 0.5 psi to about 2.0 psi, whereby nitrogen bubbling in said oil due to changes in pressure is substantially minimized, wherein step (a) further comprises:

(a1) supplying said nitrogen at a relatively low pressure during a first interval; and (a2) supplying said nitrogen at a relatively high pressure during a second interval.

2. The method of claim 1, further comprising:

(c) regulating the ambient temperature of said power handling equipment in a range from a low value to a high value.

3. The method of claim 2, wherein said high value is approximately 40° C. and said low value is approximately 0° C.

4. The method of claim 1, wherein step (a1) derives said nitrogen from a supply of compressed air.

5. The method of claim 4, wherein step (a2) derives said nitrogen from a highly pressurized source.

6. The method of claim 5, wherein said first interval is a normal operating interval and said second interval is a start up interval.

7. A system for controlling a positive nitrogen atmosphere in ullage above a volume of oil in an electrical power handling equipment, said system comprising:

a supply of nitrogen connected to supply said nitrogen along a delivery path to said ullage; and a pressure control connected with said delivery path to control the pressure of said nitrogen in said ullage in a range of about 0.5 psi to about 2.0 psi, whereby nitrogen bubbling in said oil due to changes in pressure is substantially minimized, wherein said supply of nitrogen includes a nitrogen generator that supplies said nitrogen at a relatively low pressure during a first interval and a relatively highly pressurized source that supplies said nitrogen at a relatively high pressure during a second interval.

8. The system of claim 7, further comprising:

a temperature regulator that regulates the ambient temperature of the power handling equipment in a range from a low value to a high value.

9. The system of claim 8, wherein said high value is approximately 40° C. and said low value is approximately 0° C.

10. The system of claim 7, wherein said first interval is a normal operating interval and said second interval is a start up interval.

11. The system of claim 7, further comprising a distributor for distributing said nitrogen to said ullage and to at least one accessory of said electrical power handling equipment.

12. The system of claim 11, wherein said electrical power handling equipment is a power transformer and said accessory is load tap changer.

13. The system of claim 11, wherein said electrical power handling equipment is a power transformer and said accessory is a control box.

* * * * *

UNITED STATES PATENT AND TRADEMARK OFFICE
CERTIFICATE OF CORRECTION

PATENT NO. : 6,581,694 B2
DATED : June 24, 2003
INVENTOR(S) : Thomas M. Golner et al.

It is certified that error appears in the above-identified patent and that said Letters Patent is hereby corrected as shown below:

Title page,
Item [73], Assignee, "Waukesha Electrical Systems, Inc." should be changed to -- Waukesha Electric Systems, Inc. --.

Signed and Sealed this

Seventh Day of October, 2003

JAMES E. ROGAN
*Director of the United States Patent and Trademark Office*